United States Patent
Dhanikonda et al.

(10) Patent No.: US 9,774,866 B1
(45) Date of Patent: Sep. 26, 2017

(54) REDUCING ARTIFACTS WITHIN A VIDEO PROCESSING SYSTEM USING A BUFFER MANAGEMENT SYSTEM

(71) Applicant: Xilinx, Inc., San Jose, CA (US)

(72) Inventors: Venkata V. Dhanikonda, Secunderabad (IN); Arun Ananthapadmanaban, Hyderabad (IN)

(73) Assignee: XILINX, INC., San Jose, CA (US)

( * ) Notice: Subject to any disclaimer, the term of this patent is extended or adjusted under 35 U.S.C. 154(b) by 286 days.

(21) Appl. No.: 14/639,405

(22) Filed: Mar. 5, 2015

Related U.S. Application Data

(62) Division of application No. 13/288,309, filed on Nov. 3, 2011, now Pat. No. 8,989,277.

(51) Int. Cl.
*H04N 19/146* (2014.01)
*H04N 7/12* (2006.01)
*H04L 12/861* (2013.01)

(52) U.S. Cl.
CPC ........... *H04N 19/146* (2014.11); *H04L 49/90* (2013.01)

(58) Field of Classification Search
CPC ....... G09G 2320/0693; G09G 2320/08; G09G 2370/10; G09G 5/006; G09G 5/008; G09G 5/12; H04L 25/14; H04L 7/0012; H04N 21/4305; H04N 7/12
USPC .................................................. 375/240.24
See application file for complete search history.

(56) References Cited

U.S. PATENT DOCUMENTS

| | | | |
|---|---|---|---|
| 5,621,428 A | 4/1997 | King et al. | |
| 5,877,812 A * | 3/1999 | Krause | H04N 7/17336 348/E7.073 |
| 6,157,674 A * | 12/2000 | Oda | H04N 21/23406 370/503 |
| 6,751,360 B1 | 6/2004 | Lu | |
| 6,862,278 B1 * | 3/2005 | Chang | H04N 19/176 348/384.1 |
| 7,225,354 B2 | 5/2007 | Tseng | |
| 7,477,169 B2 | 1/2009 | Carter et al. | |
| 7,853,731 B1 | 12/2010 | Zeng | |
| 8,645,585 B2 | 2/2014 | Wyatt et al. | |
| 2005/0281255 A1 | 12/2005 | Davies et al. | |
| 2006/0107187 A1 * | 5/2006 | Hannuksela | H04L 12/5693 714/776 |
| 2007/0097257 A1 * | 5/2007 | El-Maleh | H04N 21/23406 348/419.1 |
| 2008/0310505 A1 * | 12/2008 | Yan | H04N 7/52 375/240.03 |
| 2009/0278763 A1 | 11/2009 | Zeng et al. | |
| 2010/0208753 A1 | 8/2010 | Brown | |

(Continued)

OTHER PUBLICATIONS

Specification and drawings for U.S. Appl. No. 13/288,309, filed Nov. 3, 2011, Dhanikonda et al.

*Primary Examiner* — Francis G Geroleo

(74) *Attorney, Agent, or Firm* — Kevin T. Cuenot

(57) ABSTRACT

A video processing system can include a buffer, a packetizer block that is coupled to the buffer, and a buffer controller that is coupled to the buffer and the packetizer block. The buffer is capable of receiving and storing a video signal as video data. The packetizer block is capable of packetizing video data read from the buffer and sending packetized data to a node external to the video processing system. The buffer controller is capable of controlling an amount of video data included within each packet generated by the packetizer block.

7 Claims, 5 Drawing Sheets

(56) References Cited

U.S. PATENT DOCUMENTS

| | | |
|---|---|---|
| 2011/0013702 A1* | 1/2011 | Fujita .............. H04N 21/23611 375/240.26 |
| 2011/0205433 A1 | 8/2011 | Altmann |
| 2012/0079162 A1 | 3/2012 | Jaramillo |
| 2012/0086769 A1 | 4/2012 | Huber et al. |
| 2012/0207208 A1 | 8/2012 | Wyatt et al. |
| 2012/0257699 A1 | 10/2012 | Choi et al. |

* cited by examiner

REDUCING ARTIFACTS WITHIN A VIDEO PROCESSING SYSTEM USING A BUFFER MANAGEMENT SYSTEM

CROSS-REFERENCE TO RELATED APPLICATION

This application is a divisional of U.S. patent application Ser. No. 13/288,309 filed on Nov. 3, 2011, which is hereby incorporated herein by reference.

TECHNICAL FIELD

One or more embodiments disclosed within this specification relate to video processing. More particularly, one or more embodiments relate to reducing artifacts within a video processing system.

BACKGROUND

There are a variety of different types of displays available for use with media systems, computing devices, or the like. Each different type of display can be implemented using a selected technology and have particular specifications such as screen resolution, etc. Each display can communicate with a video sending unit responsible for sending the video data to be rendered upon the display through a display interface.

In general, the display interface can define the mechanism and communication protocol through which the video sending unit communicates with the display intended to render the video data. In some cases, the display interface is designed in a robust manner to provide flexibility with respect to the particular display types supported. For example, some display interfaces can support more than one different display type where each has a different resolution.

The existence of anomalies within the video data, e.g., unexpected packets, misaligned signals, etc., can manifest themselves in the form of visual artifacts upon the display. In some cases, the display can go blank, e.g., display no picture at all, which is undesirable for the end user viewing the display.

SUMMARY

One or more embodiments disclosed within this specification relate to video processing and, more particularly, to reducing artifacts within a video processing system.

An embodiment can include a video processing system. The video processing system can include an alignment detector block configured to determine whether a video signal is misaligned and, responsive to determining that the video signal is misaligned, generate notifications indicating misalignment of the video signal. The video processing system also can include an unlock detector block, coupled to the alignment detector block, configured to determine an amount of time that the video signal is misaligned according to the notifications from the alignment detector block. The unlock detector block can be configured to ignore misalignment of the video signal until the video signal is misaligned for an amount of time exceeding a threshold amount of time.

Another embodiment can include a video processing system. The video processing system can include a buffer configured to receive and store a video signal as video data and a packetizer block coupled to the buffer. The packetizer block can be configured to packetize video data read from the buffer and send packetized data to a node external to the video processing system. The video processing system further can include a buffer controller coupled to the buffer and the packetizer block. The buffer controller can be configured to control an amount of video data included within each packet generated by the packetizer block.

Another embodiment can include a method of video processing. The method can include storing received video data specified by a video signal within a buffer and determining an occupancy of the buffer. The method further can include determining whether a last packet condition is detected from a scan line within the video signal and controlling a size of each packet generated according to whether the last packet condition is detected using a controller.

DETAILED DESCRIPTION

While the specification concludes with claims defining features of one or more embodiments that are regarded as novel, it is believed that the one or more embodiments will be better understood from a consideration of the description in conjunction with the drawings. As required, one or more detailed embodiments are disclosed within this specification. It should be appreciated, however, that the one or more embodiments are merely exemplary. Therefore, specific structural and functional details disclosed within this specification are not to be interpreted as limiting, but merely as a basis for the claims and as a representative basis for teaching one skilled in the art to variously employ the one or more embodiments in virtually any appropriately detailed structure. Further, the terms and phrases used herein are not intended to be limiting, but rather to provide an understandable description of the one or more embodiments disclosed herein.

One or more embodiments disclosed within this specification relate to video processing and, more particularly, to reducing artifacts within a video processing system. In accordance with the inventive arrangements disclosed within this specification, embodiments of a video processing system and video processing techniques are disclosed. The video processing system and corresponding video processing techniques relate to maintaining lock with respect to a video signal and buffer management.

In one aspect, for example, a video signal can be processed to distinguish between situations in which the video processing system loses lock on the video signal on a temporary basis as compared to situations in which loss of lock on the video signal is not considered temporary. For example, when the loss of lock is considered temporary, initiating an alignment training process is not required to re-establish lock. In situations not considered to be temporary in nature, the video processing system must initiate the alignment training process in order to re-establish lock on the video signal.

In another aspect, the video signal can be transmitted in Main Link using buffer management while packetizing a received video signal. The video signal can be packetized and processed in a manner that prevents packets having zero or no payload from being sent from the video processing system to a display, for example. Accordingly, a reduction in the appearance of artifacts as rendered upon a display can be achieved through application of the one or more embodiments disclosed within this specification, whether independently applied or applied in combination.

Figure 1A:
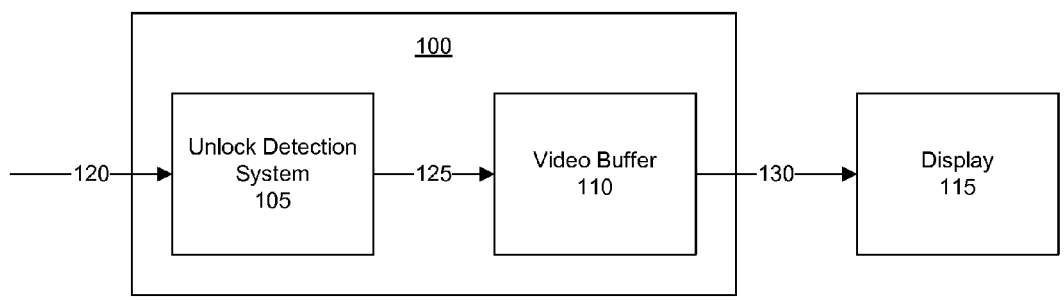
FIG. 1A is a block diagram illustrating a video processing system in accordance with an embodiment disclosed within this specification.

FIG. 1A is a block diagram illustrating a video processing system 100 in accordance with an embodiment disclosed within this specification. In general, video processing system 100 can perform unlock detection within a system, such as a receiver, that is configured to receive video data from a Main Link. As shown, system 100 can include an unlock detection system 105 and a video buffer 110. Unlock detection system 105 and video buffer 110 each can be implemented in the form of circuitry. The circuitry can be dedicated circuitry that does not execute program code, circuitry that is at least in part, or entirely, configured to execute program code such as a processor (e.g., a central processing unit), or a combination of both. Video processing system 100 further can include, or be coupled to, a display 115 or another processing system.

Unlock detection system 105 can be configured to receive a video signal 120 and generate or output video signal 125. Unlock detection system 105 can provide video signal 125 to an input of video buffer 110. As shown, video buffer 110 can process video signal 125 and output a video signal 130 to display 115. For example, video buffer 110 can store video data as specified in video signal 125 for subsequent transmission to display 115 in the form of video signal 130. Display 115 can be configured to render, e.g., show, images upon the screen as specified by video signal 130.

In general, unlock detection system 105 can be configured to analyze video signal 120 and determine whether video signal 120 is aligned or not, e.g., is misaligned. Further, unlock detection system 105 can determine whether any detected misalignment with respect to video signal 120 requires implementation of an alignment training process or does not require implementation of the alignment training process, e.g., is temporary in nature. For example, a misalignment condition that does not require implementation of an alignment training process can occur as a consequence of a bit error or corruption of a particular bit or bits. Subsequent to the bit error, however, unlock detection system 105 can determine that video signal 120 is again aligned without the need for implementing the alignment training process. In this regard, the occurrence of a bit error or small amount of data corruption can be considered a temporary condition that does not require implementation of the alignment training process.

Video processing system 100 can be used, or incorporated, within any of a variety of larger systems. For example, video processing system 100 can be incorporated within a computer and used to process and/or convey video signals to a monitor or other display coupled to the computer. In general, video processing system 100 can be implemented within a receiver. Video processing system 100 also can be configured to output a video signal, e.g., video signal 130, to another processor or theater system.

In one embodiment, video signals 120 and/or 130 can be formatted or implemented using a serial protocol that can transmit video data using multiple lanes to increase bandwidth. For example, video signals 120 and 130 can be formatted or implemented according to DisplayPort protocol. DisplayPort protocol, or simply DisplayPort, is an example of a protocol that utilizes multiple lanes to send data. DisplayPort refers to a digital display interface standard produced by the Video Electronics Standards Association (VESA).

DisplayPort utilizes packetized data transmission for conveying information. In general, packetized data that conforms to DisplayPort protocol can include or specify an embedded clock. The physical connectors utilized with DisplayPort can support 1, 2, or 4 differential data pairs referred to as "lanes." The lanes of a DisplayPort video signal can be collectively referred to as a "Main Link." Each lane can have a raw data rate of 1.62, 2.7, or 5.4 Gigabits per second (Gbps). Data can be encoded using an 8b/10b encoding with 8 bits of data being encoded by a 10 bit symbol. The encoding yields an effective data rate of 1.296, 2.16, or 4.32 Gbps for the lanes.

DisplayPort can convey video only, audio only, or both video and audio data and/or signals concurrently. In this regard, reference to video signals and video data within this specification can refer to video only signals and/or data or to signals and/or data that specifies or includes both video and audio. For example, video signal 120 can be a Main Link signal as described.

Figure 1B:
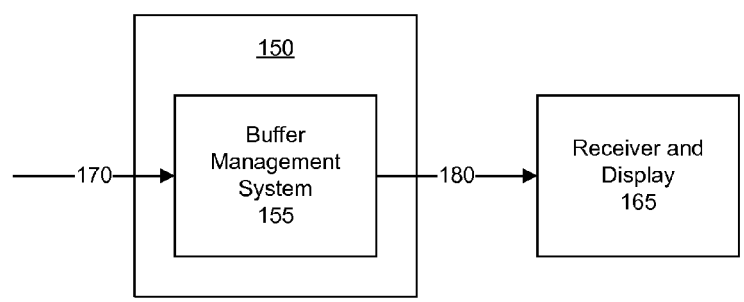
FIG. 1B is a block diagram illustrating a video processing system in accordance with another embodiment disclosed within this specification.

FIG. 1B is a block diagram illustrating a video processing system 150 in accordance with another embodiment disclosed within this specification. In general, video processing system 150 can be configured to operate within a larger system that is transmitting video, e.g., a transmitter, to a device enabled for receiving video signals formatted as Main Link. As shown, video processing system 150 can include a buffer management system 155. Buffer management system 155 can be implemented in the form of circuitry. The circuitry can be dedicated circuitry that does not execute program code, circuitry that is at least in part, or entirely, configured to execute program code such as a processor (e.g., a central processing unit), or a combination of both. Video processing system 150 further can include, or be coupled to, a receiver and display 165 or another processing system.

Buffer management system 155 can be configured to process received video signal 170 and generate video signal 180, which can be a packetized signal. Buffer management system 155 can provide video signal 180 to receiver and display 165. Receiver and display 165 can be configured to process received packets and render images upon a screen of receiver and display 165. In general, buffer management system 155 can store video signal 170 within a buffer and packetize portions of video signal 170 to be output as video signal 180. Packetization can be performed by buffer management system 155 to prevent the sending of a packet that has no payload, also referred to as a "zero length packet."

Figure 2:
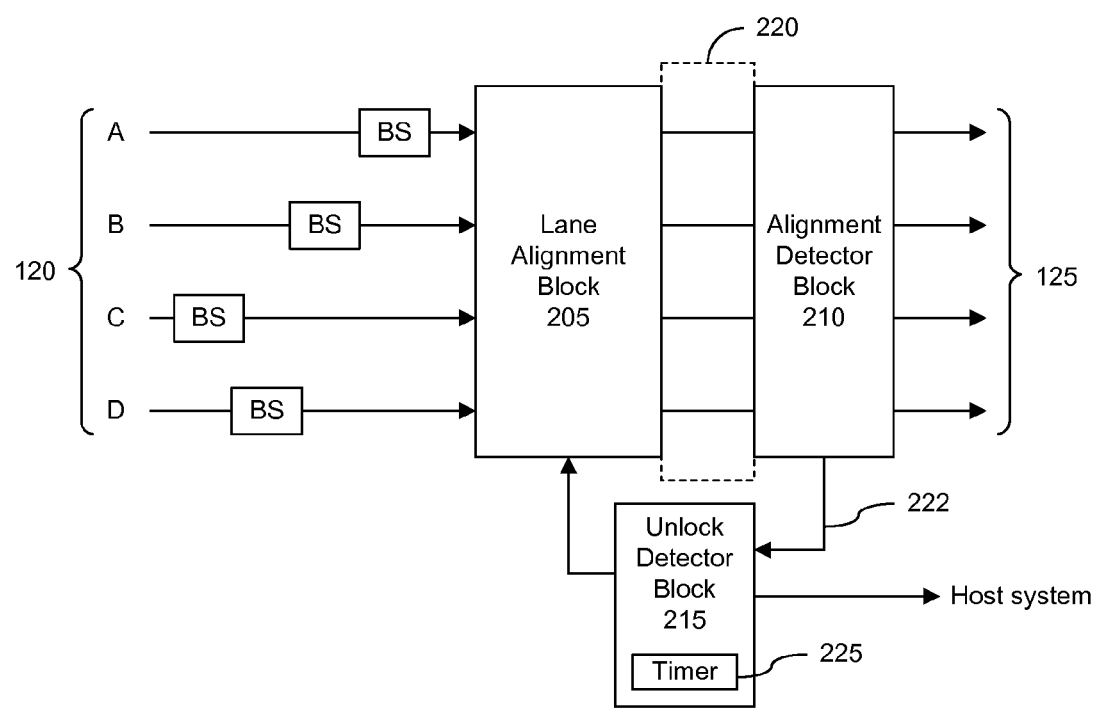
FIG. 2 is a block diagram illustrating the unlock detection system of FIG. 1A in accordance with another embodiment disclosed within this specification.

FIG. 2 is a block diagram illustrating the unlock detection system (system) 105 of FIG. 1A in accordance with another embodiment disclosed within this specification. Like numbers will be used to refer to the same items throughout this specification. System 105 can include a lane alignment block 205, an alignment detector block 210, and an unlock detector block 215. It should be appreciated that while alignment detector block 210 is shown to be directly coupled to lane alignment block 205, one or more additional processors or other circuitry (not shown) can be included within system 105 and located between, e.g., in the signal path between, lane alignment block 205 and alignment detector block 210.

As discussed with reference to FIG. 1A, the various blocks of system 105, i.e., lane alignment block 205, an alignment detector block 210, and an unlock detector block 215, can be implemented in the form of circuitry. The circuitry can be dedicated circuitry that does not execute program code, circuitry that is at least in part, or entirely, configured to execute program code such as a processor (e.g., a central processing unit), or a combination of both.

As shown, video signal 120 can be received by lane alignment block 205. In FIG. 2, video signal 120 is shown to include four lanes labeled A, B, C, and D. Lane alignment block 205 can be configured to perform an alignment, e.g., an initial alignment, on video signal 120. In general, when transmitting multiple lanes A-D that collectively form video signal 120, e.g., a "Main Link," each of lanes A-D must be properly aligned. In one aspect, each of lanes A-D can transmit an identifier or control character. The identifier can be repeatedly sent on each of lanes A-D to facilitate alignment of lanes A-D.

Lane alignment block 205 can detect the location or position of the identifier within each of lanes A-D to determine whether lanes A-D are aligned. Lane alignment block 205 can be configured to align lanes A-D of video signal 120 using the identifiers repeatedly transmitted in each of lanes A-D. In an embodiment, the identifier that is identified and used to align lanes A-D can be a "Blanking Start" (BS) symbol as is transmitted or sent within lanes of a DisplayPort type of video signal.

In general, lane alignment block 205 can implement and/or initiate an alignment training process that aligns lanes A-D according to the repeating identifiers, e.g., the BS symbols. The alignment training process can be distinguished from the general synchronization or alignment functions performed during normal operation of lane alignment block 205 that do not induce artifacts within a display. In sending video signal 120 from a transmitter to a receiver, the transmitter attempts to send video signal 120 with the lanes aligned. Due to effects of the transmission channel, the lanes of video signal 120 can become misaligned as received in the receiver. Lane alignment block 205 attempts to re-align, e.g., synchronize, video signal 120.

The alignment training process implemented and/or initiated by lane alignment block 205 can require a significant amount of time, e.g., significantly more than synchronization of lanes that is performed post alignment training or initialization. In one aspect, the alignment training process can be a software driven or implemented process. For example, as noted, lane alignment block 205 can be implemented in whole or in part using a processor that can execute software, e.g., program code, to execute operations that implement the alignment training process. In another aspect, lane alignment block 205 can be implemented as a circuit block that does not execute program code.

During times when system 105 does not have "lock" on video signal 120, e.g., when the video signal is determined to be misaligned, lane alignment block 205 can initiate and/or perform the alignment training process. During that time, however, an end user viewing a display that renders the video signal ultimately received from video processing system 100 can experience or see artifacts within the rendered video, e.g., within the rendered visual images presented upon the display. In some cases, a total loss or dropout of video can occur. The alignment training process can require seconds to complete, leading to a poor user experience.

Due to the sometimes lengthy duration of the alignment training process, it can be beneficial for system 105 to distinguish between a misalignment condition that requires implementation of the alignment training process and a misalignment condition that does not. For example, a first type of misalignment condition can refer to situations in which a random error occurs. Examples of random errors can include bit errors or other small corruption of bits. In such cases, video processing system 100, if left to continue processing video signals without implementing the alignment training process, likely regains lock. An error in the video signals is interpreted as a misalignment condition that resolves itself due to the isolated nature of the error since after passage of the random error the lanes remain aligned.

A second type of misalignment condition refers to the situation in which the video signal is misaligned and implementation of the alignment training process is needed. For example, the second type of misalignment condition can occur when the video signal remains misaligned for more than a predetermined amount of time. The amount of time can be measured in terms of the number of identifiers repeated within a given lane.

Accordingly, lane alignment block 205 can align, e.g., synchronize, lanes A-D of video signal 120 according to the BS symbols within each respective lane. Lane alignment block 205 can output video signal 220 to alignment detector block 210. As discussed, one or more intervening circuit elements or systems can be located in the signal path including video signal 220. Alignment detector block 210 can be configured to detect whether video signal 220 is aligned or misaligned. Responsive to detecting that video signal 220 is misaligned, alignment detector block 210 can output a misalignment notification via signal 222 to unlock detector block 215. Responsive to detecting that video signal 220 is again aligned, alignment detector block 210 can output an alignment notification to unlock detector block 215 via signal 222 indicating that video signal 220 is aligned.

Unlock detector block 215 can be configured to determine or calculate the amount of time that video signal 220 remains misaligned. For example, unlock detector block 215 can include a timer 225 that can be started, stopped, and/or reset responsive to the notifications received from alignment detector block 210 via signal 222. Responsive to determining that video signal 220 remains misaligned for an amount of time that exceeds a predetermined, minimum amount of time, e.g., a threshold time, unlock detector block 215 can issue a notification to implement the alignment training process to lane alignment block 205. In one aspect, the predetermined, minimum amount of time can be an amount of time that is an integer multiple of the time period between two consecutive identifiers or BS symbols. Further, unlock detector block 215 can issue a notification to a host system, e.g., a software host. The host system, for example, can reside within the transmitter.

For example, unlock detector block 215 can be configured to provide a status indicator to the host system. In general, system 105 can communicate with the host system within the transmitter through an auxiliary channel, e.g., a sideband, to indicate the status of the system and request re-initiation of transmission starting with the training process. Lane alignment block 205 then can implement the alignment training process on training data received on the Main Link.

Figure 3:
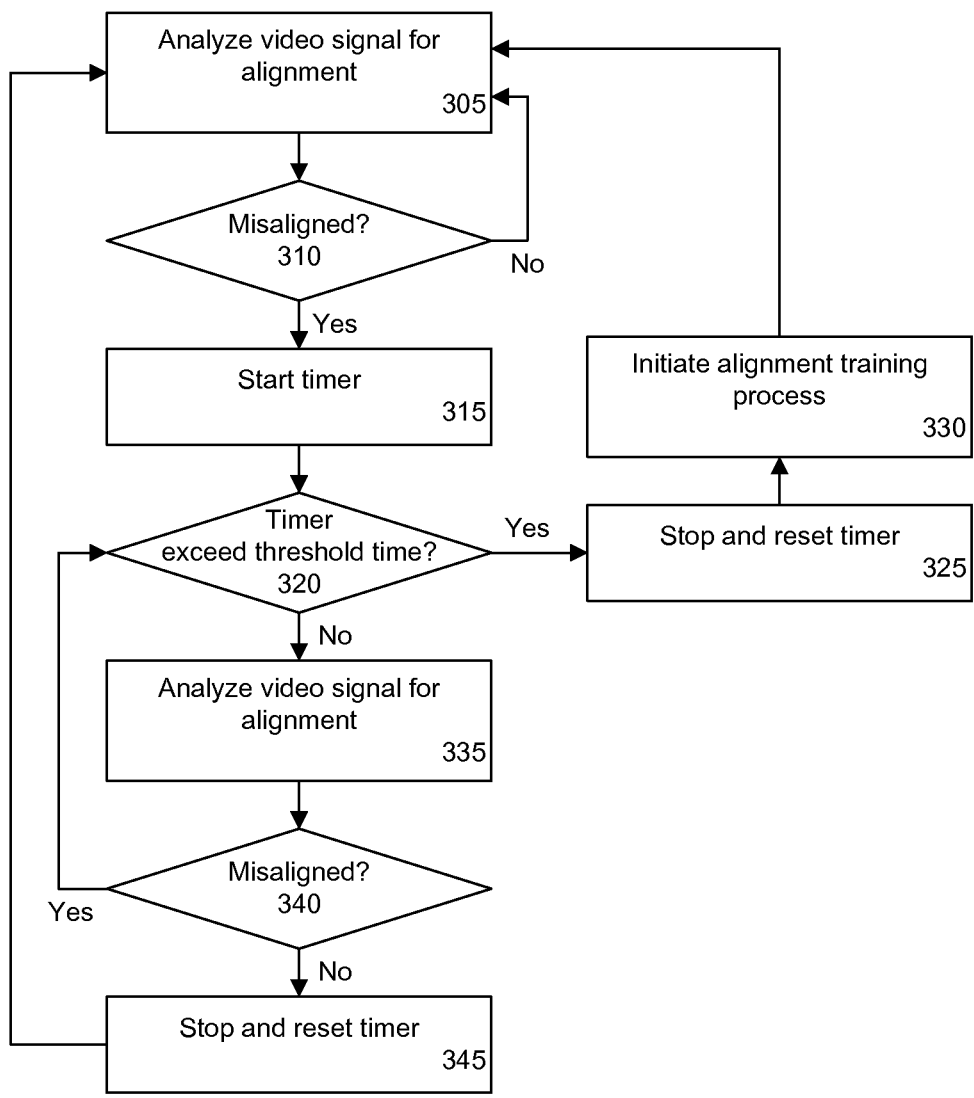
FIG. 3 is a flow chart illustrating a method of video processing in accordance with another embodiment disclosed within this specification.

FIG. 3 is a flow chart illustrating a method 300 of video processing in accordance with another embodiment disclosed within this specification. More particularly, method 300 illustrates a process for detecting unlock conditions and, further, distinguishing between different types of misalignment conditions that require different handling techniques. Method 300 can be implemented by a system as described with reference to FIGS. 1A and 2.

In block 305, the alignment detector block can begin analyzing or checking a received video signal to determine whether the multiple lanes of the video signal are aligned. As discussed, the alignment detector block can determine whether the lanes of the video signal are aligned by determining whether the repeating identifiers within each lane are time aligned, e.g., occur or are detected at the same time within each lane of the video signal. For example, the alignment detector block can begin checking the video signal after lock is achieved, e.g., after an alignment training process or other initialization process is performed.

In block 310, the alignment detector block can determine whether the video signal is misaligned. Responsive to determining that the video signal is misaligned, method 300 can continue to block 315. Responsive to determining that the video signal is not misaligned, i.e., is aligned, method 300 can loop back to block 305 to continue processing.

In block 315, the unlock detector block can start a timer. For example, responsive to determining that the video signal is misaligned, the alignment detector block can output a misalignment notification to the unlock detector block. Responsive to the misalignment notification, the unlock detector block can start the timer.

In block 320, the unlock detector block can determine whether the amount of time, as measured by the timer, has exceeded a threshold time. The threshold time can represent a predetermined, minimum amount of time. As discussed, the predetermined, minimum amount of time can be equal to the time period in which a predetermined number of BS symbols can be detected. For example, the predetermined, minimum amount of time can be equal to a window of time defined by "N" BS symbols where "N" is an integer value. Examples of N can include, but are not limited to, 8, 64, 128, or the like.

In one aspect, the threshold time can be selected or determined by a system designer. For example, when the unlock detection system is implemented within a programmable integrated circuit, the value loaded into the integrated circuit and used for the threshold time can be one that is programmable by the designer or developer. In this regard, the timer value can be selectable. For purposes of illustration, the timer can be loaded with a value that corresponds to the detection of approximately 64 BS symbols or control characters on a given lane or group of lanes.

Responsive to determining that the timer has exceeded the threshold time, method 300 can continue to block 325. In block 325, the unlock detector block can stop the timer and reset the timer. In block 330, the unlock detector block can initiate the alignment training process. Blocks 325 and 330, for example, represent a determination that the misalignment condition that is detected is the second type of misalignment condition. In this example, the criterion used is that the misalignment condition persists for more than the predetermined, minimum amount of time.

Responsive to determining that the timer has not exceeded the threshold time, method 300 can proceed to block 335. A determination that the timer has not exceeded the threshold time indicates that the misalignment condition is still being interpreted as a misalignment condition of the first type that does not require implementation of the alignment training process.

Due to the potential for significant video dropouts, distinguishing between occasions where loss of alignment actually occurs as compared to other occasions where a random error occurs from which the video processing system can recover can be useful. When a random error occurs, for example, the video processing system typically recovers in a small amount of time with the user experiencing minimal visual artifacts in the video. The amount of time to recover is typically less than the amount of time needed to implement the alignment training process.

Accordingly, in block 335, the alignment detector block can continue to analyze the video signal for alignment. In block 340, the alignment detector block can determine whether the video signal is misaligned. Responsive to determining that the video signal is misaligned, method 300 can loop back to block 320 to continue checking the timer. Responsive to determining that the video signal is no longer misaligned, method 300 can proceed to block 345. For example, responsive to the alignment detector block determining that the video signal is no longer misaligned, the alignment detector block can output an alignment notification to the unlock detector block. In block 345, the unlock detector block can stop and reset the timer. For example, the unlock detector block can implement block 345 responsive to the alignment notification from the alignment detector block. After block 345, method 300 can proceed to block 305 to continue processing.

Figure 4:
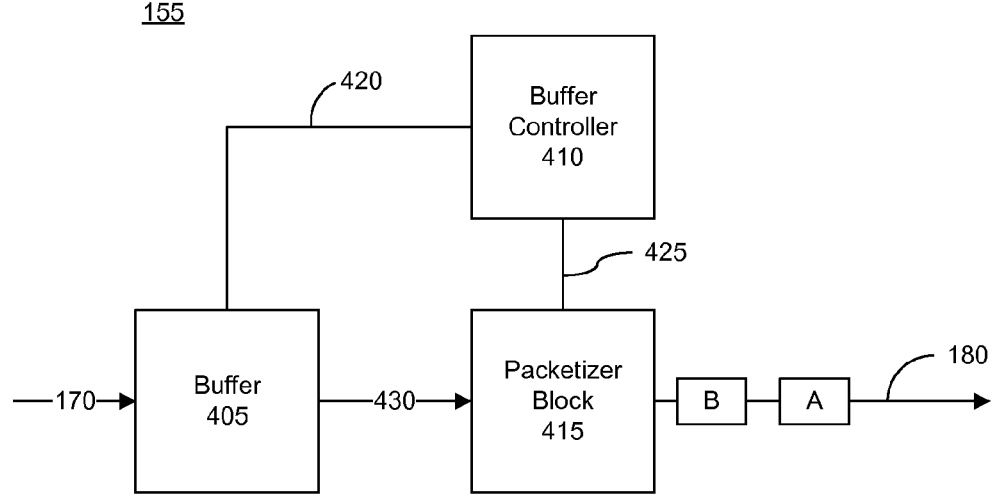
FIG. 4 is a block diagram illustrating the buffer management system of FIG. 1B in accordance with another embodiment disclosed within this specification.

FIG. 4 is a block diagram illustrating the buffer management system (system) 155 of FIG. 1B in accordance with another embodiment disclosed within this specification. System 155 can include a buffer 405, a buffer controller 410, and a packetizer block 415. As discussed with reference to FIG. 1B, the various blocks of system 155, i.e., buffer 405, a buffer controller 410, and a packetizer block 415, can be implemented in the form of circuitry. The circuitry can be dedicated circuitry that does not execute program code, circuitry that is at least in part, or entirely, configured to execute program code such as a processor (e.g., a central processing unit), or a combination of both. In this regard, the term "controller," for example, buffer controller 410, is intended to refer to hardware, whether the hardware implementation is in the form of circuitry that is implemented as a processor, includes a processor, or does not execute program code.

In general, buffer 405 can be configured to receive video signal 170. Buffer controller 410 can analyze the contents of buffer 405 and, based upon one or more determinations made with respect to the contents of buffer 405, can instruct packetizer block 415 as to the size, e.g., the number of bytes, of video data to include in a payload portion of each packet output from packetizer block 415 to the receiver and display.

As discussed with respect to DisplayPort, video scan lines can be packed as "mini-packets" and transmitted over a Main Link, e.g., video signal 180. As discussed, the Main Link can operate at 2.7 Gbps and at 1.62 Gbps. Video pixel frequencies, however, can range from 25-300 MHz. Pixel data from buffer 405 can be read and formed into mini-packets. For proper rate matching with respect to video signal 180, some techniques seek to statically set mini-packet size according to the link rate and lane count to properly utilize bandwidth.

DisplayPort requires that the input video bandwidth be less than or equal to the Main Link bandwidth. Products are available, for example, that under utilize bandwidth where the video buffer fill rate does not match the available bandwidth. In general, data comes into a video buffer of the video processing system at a slower rate than the rate at which data is taken from the video buffer, packed into mini-packets, and sent. For example, consider a case in which video data having a configuration such as 640×480 @ 60 Hz is sent over 4-lanes at 2.7 Gbps. In such a case, the buffer fill rate does not match the available bandwidth and causes the video processing system to send empty mini-packets, e.g., to the display.

When the video buffer has no remaining content due to the speed at which the mini-packets are transmitted, one or more empty mini-packets, e.g., zero length packets, are transmitted to the display. An empty mini-packet or zero length packet refers to a packet containing no payload or content. The processing of an empty mini-packet by a display typically results in the presentation of a visual artifact that is discernable by the end user. For example, some display units become, or go, blank or enter a power-down state responsive to receiving or processing an empty mini-packet. In other cases, significant artifacts, e.g., noise, are visible.

As shown, buffer 405 can receive video signal 170. Video signal 170 is stored within buffer 405 in the form of video data. Buffer controller 410 can monitor the quantity or amount of video data stored within buffer 405 via signal 420. In general, buffer controller 410 ensures that sufficient video data remains stored within buffer 405 to prevent the transmission or formation of any zero length packets by packetizer block 415.

For example, buffer control 410 can utilize buffer occupancy, i.e., the amount of video data stored within buffer 405 as specified by signal 420, to control the size of mini-packets that are generated and sent. Within various video processing systems, a minimum mini-packet size can exist. In one example, buffer controller 410 can continually determine a value according to the expression "N-M," where "N" represents the occupancy of buffer 405 and "M" represents the residual video data that must be maintained within buffer 405 to avoid sending a zero length packet. In one aspect, the value of M can be set to the minimum mini-packet size for the video processing system. For example, values of M can be set to 1, 2, or 4, where M and N can be integer values expressed in bytes.

Buffer controller 410 can be configured to continually monitor occupancy of buffer 405 and report the size of the payload of packets to be generated to packetizer block 415 via signal 425. Packetizer block 415 can be configured to read or extract the amount of data specified by buffer controller 410 from buffer 405, generate a mini-packet or packets by using the read data as the payload, and send the mini-packet(s). In one aspect, buffer controller 410 can specify an amount of video data to be read that is less than the occupancy, which specifies the amount of video data stored within buffer 405. In another aspect, buffer controller 410 can specify the occupancy of buffer 405 as the amount of video data to be read.

For example, given a buffer occupancy of 6 bytes, e.g., 6 bytes of video data are stored in buffer 405, where M is set equal to 2 bytes, buffer management system 155, e.g., packetizer block 415, can generate and transmit a mini-packet of 4 bytes (shown as "A"), e.g., the value from the expression M-N received from buffer controller 410. More particularly, buffer controller 410 provides a value of 4 to packetizer block 415. In response, packetizer block 415 reads 4 bytes of video data from buffer 405 via signal 430. Packetizer block 415 then packetizes the 4 bytes of data, e.g., placing the 4 bytes of data in a payload portion of a mini-packet. Accordingly, buffer 405 retains 2 bytes of video data. Packetizer block 415 has 2 bytes of video data available for sending a subsequent mini-packet thereby avoiding the formation and sending of a zero length packet as the next mini-packet. The 2 bytes of data can be formed into a separate mini-packet and sent (shown as "B") in a subsequent or last operation.

Without regulating the flow of data as described, a single mini-packet having a payload of the entire 6 bytes can be sent, which would leave zero bytes stored within buffer 405. When no further video data is stored in buffer 405 prior to sending a next mini-packet, the next mini-packet sent would be a zero length packet that could potentially cause the display receiving the mini-packets to go blank or display other visual artifacts.

In another example, consider the case in which buffer 405 has an occupancy of 8 bytes. In that case, packetizer block 415 can generate a mini-packet of 6 bytes (shown as "A") and send the mini-packet. The remaining 2 bytes are kept within buffer 205. Packetizer block 415 then generates a 2 byte mini-packet (shown as "B") with the residual data, which is the remaining data or occupancy of buffer 405 and 2 bytes in this case, and sends the mini-packet. Again, the data is packetized, at least initially, according to the result of the expression N-M, as calculated by buffer controller 410 and provided to packetizer block 415, as opposed to sending an 8 byte mini-packet, e.g., the entirety of the video data within buffer 405 as a single mini-packet, followed by an empty mini-packet.

Using buffer management system 155 as described reduces and/or eliminates the possibility that an empty mini-packet will be transmitted. The left over payload not sent, e.g., the residual of M bytes, is sent within a separate and last mini-packet.

Figure 5:
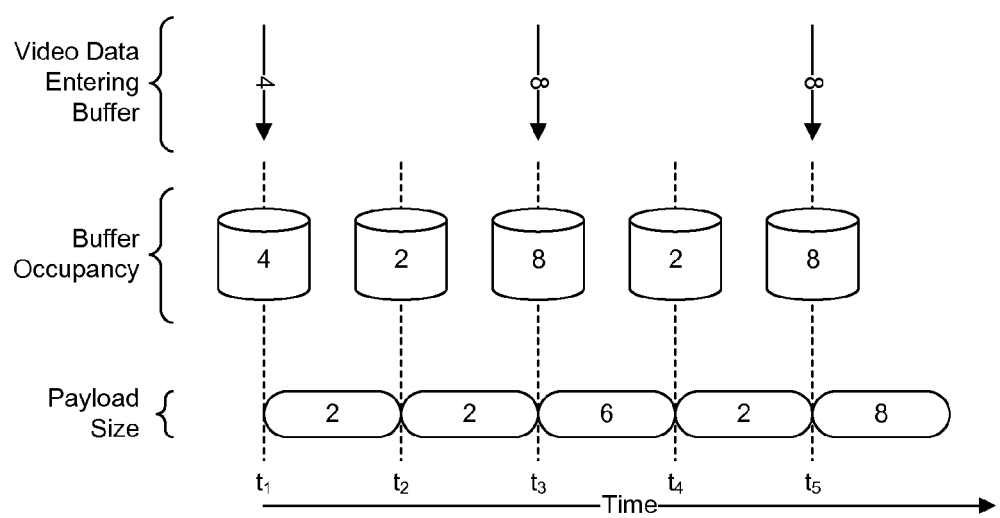
FIG. 5 is a block diagram illustrating the buffer management technique described with reference to FIGS. 1B and 4.

FIG. 5 is a block diagram illustrating the buffer management technique described with reference to FIGS. 1B and 4. The arrows along the top illustrate incoming video data of 4 bytes, 8 bytes, and 8 bytes respectively. The dashed vertical lines extending through the pictorial illustrations of the buffer over time illustrate the times $t_1$-$t_5$ at which the packetizer block accesses the buffer to generate and send a packet.

For example, at time $t_1$, 4 bytes of video data are received into the buffer. Presuming that the buffer starts with no video data stored therein, the occupancy of the buffer is 4 bytes, e.g., N=4. Continuing to use the value of 2 bytes for M, it can be seen that the packetizer block generates a mini-packet with a payload size of 2 bytes read from the buffer. The buffer, therefore, has 2 bytes remaining. At time $t_2$, no further video data is received into the buffer. Accordingly, the buffer still has an occupancy of 2 bytes, which is equal to the residual data factor, e.g., N=M=2. The packetizer block reads the 2 bytes, generates a mini-packet using the 2 bytes read from the buffer as the payload.

At time $t_3$, 8 bytes of video data are received into the buffer. Since all residual data was sent in the packet generated at time $t_2$, the buffer has a total of 8 bytes of video data stored therein. Thus, N=8. The packetizer block generates a mini-packet with a payload size of 6 bytes read from the buffer. The buffer, therefore, has 2 bytes remaining. At time $t_4$, no further video data is received into the buffer. Accordingly, the buffer still has an occupancy of 2 bytes, e.g., $N=M=2$. The packetizer block reads the 2 bytes and generates a mini-packet using the 2 bytes read from the buffer as the payload.

At time $t_5$, 8 bytes of video data are received into the buffer. Since all residual video data was sent in the packet generated at time $t_4$, the buffer has a total of the 8 bytes of video data stored therein, e.g., $N=8$. In one aspect, responsive to detecting a last packet condition within a scan line of the video signal being processed, the packetizer block generates a mini-packet with a payload size equal to the occupancy of the buffer, e.g., 8 bytes as read from the buffer in this case, which completely depletes the buffer leaving no further residual data stored therein.

From the example illustrated in FIG. 5, it can be seen that had no video data been retained within the buffer, the video processing system would have sent zero length packets. For example, at time $t_1$, the packetizer block would have generated and sent a mini-packet with all 4 bytes of data. At time $t_2$, the packetizer block would have generated a zero length packet. At time $t_3$, the packetizer block would have generated and sent a mini-packet with 8 bytes of payload. Accordingly, at time $t_4$, the packetizer block would have sent another zero length packet.

Figure 6:
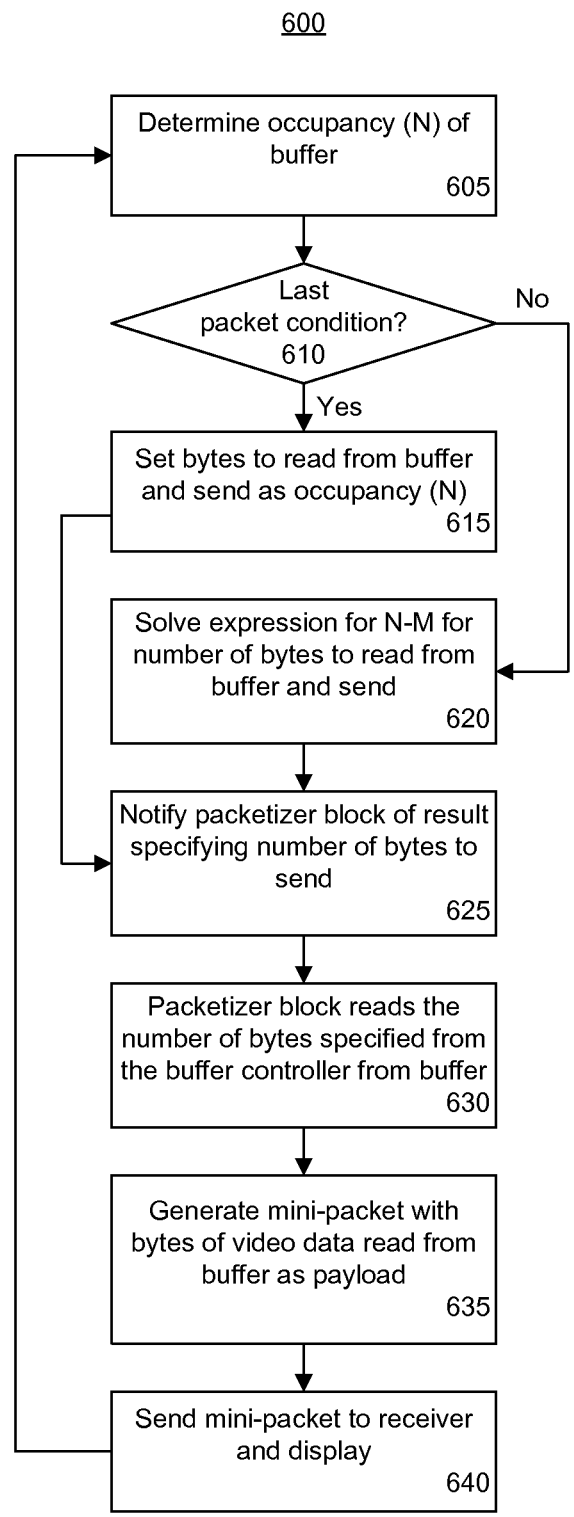
FIG. 6 is a flow chart illustrating a method of video processing in accordance with another embodiment disclosed within this specification.

FIG. 6 is a flow chart illustrating a method 600 of video processing in accordance with another embodiment disclosed within this specification. More particularly, method 600 illustrates a method of buffer management. Method 600 can be performed by a system as described with reference to FIGS. 1B, 4, and 5 of this specification. Method 600 can begin in a state where the value of M is set and known as a system parameter, for example.

In block 605, the system can determine the occupancy of the buffer. For example, the buffer controller can determine the occupancy of the buffer. As noted, the occupancy of the buffer specifies a total amount of video data (e.g., unsent or un-packetized video data) stored within the buffer. It should be appreciated that the buffer can continually receive video data to be stored therein. In this regard, when the occupancy of the buffer is determined, the occupancy can be determined as of a particular instance in time, e.g., when block 605 is implemented.

In block 610, the buffer controller can determine whether a last packet condition has been detected. The last packet condition can be determined according to scan line information that is received within the video signal being processed. Responsive to detecting the last packet condition, the residual data, e.g., any remaining bytes, within the buffer can be sent as a mini-packet. Accordingly, responsive to detecting the last packet condition, method 600 can continue to block 615. In block 615, the buffer controller determines that the occupancy of the buffer is the amount of data or number of bytes to be read from the buffer (e.g., $N=M$). More particularly, the buffer controller can set the value for the number of bytes to read from the buffer equal to the occupancy of the buffer. For example, the value of N is provided to the packetizer block as the number of bytes to be read.

When the last packet condition is not detected, method 600 continues from block 610 to block 620. In block 620, the buffer controller can solve the expression N-M to determine the amount of data, e.g., the number of bytes, that is to be read from the buffer. In block 625, the buffer controller can notify the packetizer block of the amount of data, e.g., number of bytes, to be read from the buffer and packetized for sending. When the last packet condition is not detected, the expression result, e.g., the result from solving N-M, can be provided to the packetizer block. As noted, when the last packet condition is detected, the occupancy, e.g., N, of the buffer can be provided to the packetizer block.

In block 630, the packetizer block can read the number of bytes specified by the buffer controller, whether N-M bytes of data or any remaining data from the buffer. In block 635, the packetizer block can generate a mini-packet including the video data read from the buffer as the payload. In block 640, the packetizer block can send the newly generated mini-packet to the display. After block 640, method 600 can repeat as may be required.

Within this specification, the same reference characters are used to refer to terminals, signal lines, wires, and their corresponding signals. In this regard, the terms "signal," "wire," "connection," "terminal," and "pin" may be used interchangeably, from time-to-time, within this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

The flowcharts in the figures illustrate the architecture, functionality, and operation of possible implementations of systems and methods according to one or more embodiments disclosed within this specification. In this regard, each block in the figures can represent circuitry that can be implemented within an integrated circuit or other electronic system to perform the function(s) disclosed within this specification.

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and executable instructions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

One or more embodiments disclosed within this specification can be embodied in other forms without departing from the spirit or essential attributes thereof. Accordingly, reference should be made to the following claims, rather than to the foregoing specification, as indicating the scope of the one or more embodiments.

What is claimed is:

1. A video processing system comprising:
 a buffer configured to receive and store a video signal as video data;
 a packetizer block coupled to the buffer;

wherein the packetizer block is configured to packetize video data read from the buffer and send packetized data to a node external to the video processing system; and a buffer controller coupled to the buffer and the packetizer block;

wherein the buffer controller is configured to control an amount of video data included within each packet generated by the packetizer block;

wherein the buffer controller is configured to detect a last packet condition from a scan line specified within the video signal;

wherein responsive to not detecting the last packet condition, the packetizer block generates a packet that includes less than an amount of video data currently stored in the buffer to leave a specified residual amount of video data in the buffer; and wherein, responsive to detecting the last packet condition, the packetizer block generates a packet that includes an amount of video data currently stored within the buffer.

2. The video processing system of claim 1, wherein the buffer controller is configured to control the amount of video data included in each packet by reporting, for each packet to be generated for which a last packet condition is not detected, a payload size to the packetizer block that is less than the amount of video data currently stored within the buffer that leaves the residual amount of video data in the buffer.

3. The video processing system of claim 1, wherein the buffer controller is configured to calculate a payload size of the packet by taking a difference of an occupancy of the buffer and a residual data factor indicating the residual amount of video data to leave in the buffer for each packet for which a last packet condition is not detected.

4. The video processing system of claim 1, wherein the buffer controller is configured to control the amount of video data included in each packet by reporting, for each packet for which a last packet condition is detected, a payload size to the packetizer block that specifies occupancy of the buffer.

5. A method of video processing comprising:

storing received video data specified by a video signal within a buffer;

determining an occupancy of the buffer;

determining whether a last packet condition is detected from a scan line within the video signal;

using a controller, controlling a size of each packet generated according to whether the last packet condition is detected;

generating a packet having a payload size determined according to whether the last packet condition is detected;

responsive to not detecting the last packet condition, setting the payload size of the packet to an amount of video data that is less than the occupancy of the buffer and that leaves a specified residual amount of video data within the buffer; and responsive to detecting the last packet condition, setting the payload size of the packet to be the occupancy of the buffer.

6. The method of claim 5, further comprising:

calculating the payload size to be a difference of the occupancy of the buffer and a residual data factor specifying the residual amount of video data for each packet for which a last packet condition is not detected.

7. The method of claim 5, wherein the occupancy of the buffer specifies a total amount of video data stored within the buffer.

* * * * *